United States Patent
Curran et al.

(10) Patent No.: US 11,785,122 B2
(45) Date of Patent: Oct. 10, 2023

(54) METHOD TO REDUCE THE EFFECT OF FIXED STREAM DELIMITERS ON EMISSIONS AND RECEIVE FILTER TRAINING

(71) Applicants: Analog Devices International Unlimited Company, Limerick (IE); Pepperl+Fuchs SE, Twinsburg, OH (US)

(72) Inventors: Philip Curran, Dublin (IE); Steffen Graber, Twinsburg, OH (US)

(73) Assignees: Analog Devices International Unlimited Company, Limerick (IE); Pepperl+Fuchs SE, Twinsburg, OH (US)

( * ) Notice: Subject to any disclaimer, the term of this patent is extended or adjusted under 35 U.S.C. 154(b) by 136 days.

(21) Appl. No.: 17/611,852

(22) PCT Filed: May 18, 2020

(86) PCT No.: PCT/EP2020/063822
§ 371 (c)(1),
(2) Date: Nov. 16, 2021

(87) PCT Pub. No.: WO2020/229700
PCT Pub. Date: Nov. 19, 2020

(65) Prior Publication Data
US 2022/0086263 A1    Mar. 17, 2022

(30) Foreign Application Priority Data
May 16, 2019   (GB) ..................... 1906915

(51) Int. Cl.
*H04J 3/24*      (2006.01)
*H04L 69/22*     (2022.01)
*H04L 1/00*      (2006.01)

(52) U.S. Cl.
CPC ............ *H04L 69/22* (2013.01); *H04L 1/0076* (2013.01)

(58) Field of Classification Search
CPC ......... H04L 69/22; H04L 1/0076; H04L 9/00; H04L 2209/34; H04L 9/0662;
(Continued)

(56) References Cited

U.S. PATENT DOCUMENTS

| | | | | |
|---|---|---|---|---|
| 2008/0019389 | A1* | 1/2008 | Barrass | H04L 47/10 370/463 |
| 2008/0298323 | A1* | 12/2008 | Yi | H04L 47/2458 370/335 |
| 2014/0115374 | A1* | 4/2014 | Iyer | G06F 13/4068 713/400 |

FOREIGN PATENT DOCUMENTS

| | | |
|---|---|---|
| JP | 2012529854 | 11/2012 |
| JP | 2017220835 | 12/2017 |
| WO | 2015129375 | 9/2015 |
| WO | 2019042867 | 3/2019 |

OTHER PUBLICATIONS

"IEEE P802.3cg D3.0 Physical Layer Specifications and Management Parameters for 10 Mb/s Operation and Associated Power Delivery over a Single Balanced Pair of Conductors Initial Sponsor ballot comments", IEEE Draft, IEEE-SA, NJ USA, [Online] Retrieved from the Internet: <URL:http://www.ieee802.org/3/cg/comments/802.3cg draft3p0_Received_By%20Page%20Line.pds>, [Retrieved on May 3, 2019], (May 3, 2019), 85 pgs.
(Continued)

*Primary Examiner* — Phuongchau Ba Nguyen
(74) *Attorney, Agent, or Firm* — Schwegman Lundberg & Woessner, P.A.

(57) ABSTRACT

Systems and methods are provided for performing operations comprising: accessing, by a transmitter physical layer (PHY) controller, data for transmission to a receiver PHY controller over a network connection; randomizing a delim-
(Continued)

iter independently of randomizing the data; selecting a disparity reset value based on the randomized delimiter to generate an initial miming disparity; encoding the randomized data based on the initial running disparity; generating a frame that includes the encoded randomized data and the randomized delimiter; and transmitting the frame from the transmitter PHY controller to the receiver PHY controller.

20 Claims, 8 Drawing Sheets

(58) Field of Classification Search
CPC ........... H04L 69/323; H04L 2012/5652; H04L 29/0653; H04L 29/06; H04L 47/10; G06F 7/584; H04Q 11/0478
See application file for complete search history.

(56) References Cited

OTHER PUBLICATIONS

"International Application Serial No. PCT/EP2020/063822, International Search Report dated Jul. 17, 2020", 3 pgs.
"IEEE Std 802.3—2005 Part 3: Carrier sense multiple access with collision detection (CSMA CD) access method and physical layer specifications—Section Three", [Online] Retrieved from the Internet: <URL:http://magrawal.myweb.usf.edu/dcom/Ch3_802.3-2005_section3.pdf> (Jan. 1, 2005), 387 pgs.
"International Application Serial No. PCT/EP2020/063822, International Preliminary Report on Patentability dated Nov. 25, 2021", 8 pgs.
"Japanese Application Serial No. 2021-568733, Notification of Reasons for Rejection dated Apr. 10, 2023", w/ English Translation, 6 pgs.

* cited by examiner

310

| Delimiter | $(TA_n, TB_n, TC_n)$ |
|---|---|
| $Sy_{n-1}[4] = 0$ | |
| SSD4 | (+1,+1,−1) |
| ESD4 | (+1,−1,+1) |
| ESD_ERR4 | (−1,+1,+1) |
| $Sy_{n-1}[4] = 1$ | |
| SSD4 | (−1,−1,+1) |
| ESD4 | (−1,+1,−1) |
| ESD_ERR4 | (+1,−1,−1) |

| DISPRESET3 | DISPARITY = 1 | DISPARITY = 2 | DISPARITY = 3 | DISPARITY = 4 |
|---|---|---|---|---|
| $Sy_n[4] = 0$ | (-1, 0, 1) | (-1, 0, 0) | (-1, 0, -1) | (-1, -1, -1) |
| $Sy_n[4] = 1$ | (1, 1, 1) | (1, 0, 1) | (1, 0, 0) | (1, 0, -1) |

*FIG. 5B*

METHOD TO REDUCE THE EFFECT OF FIXED STREAM DELIMITERS ON EMISSIONS AND RECEIVE FILTER TRAINING

CROSS-REFERENCE TO RELATED APPLICATION

This document is a U.S. National Stage of PCT Application Serial No. PCT/EP2020/063822, entitled "A method to reduce the effect of fixed stream delimiters on emissions and receive filter training", filed May 18, 2020, and published as WO 2020/229700, on Nov. 19, 2020, which claims the benefit of priority to non-provisional U.K Application No. GB1906915.2, filed May 16, 2019, entitled "A method to reduce the effect of fixed stream delimiters on emissions and receive filter training," which are hereby incorporated by reference in their entirety.

FIELD OF THE DISCLOSURE

This document pertains generally, but not by way of limitation, to data transmissions in a physical layer (PHY) of a communication system.

SUMMARY OF THE DISCLOSURE

This disclosure describes systems and methods to compensate for correlation and spectral spikes caused by delimiters. In particular, the systems and methods perform operations comprising: accessing, by a transmitter physical layer (PHY) controller, data for transmission to a receiver PHY controller over a network connection; randomizing a delimiter independently of randomizing the data; selecting a disparity reset value based on the randomized delimiter to generate an initial running disparity; encoding the randomized data based on the initial running disparity; generating a frame that includes the encoded randomized data and the randomized delimiter; and transmitting the frame from the transmitter PHY controller to the receiver PHY controller.

In some implementations, the network comprises an Ethernet wired connection and the data is transmitted over the network in accordance with a 10BASE-T1L implementation.

In some implementations, the operations comprise obtaining a set of bits from a scrambler in the transmitter PHY controller. In some implementations, the operations comprise generating a delimiter randomization bit as a function of two or more bits of the set of bits. In some implementations, the function comprises an XOR operation, and wherein the two or more bits include a bit in a thirteenth position and a bit in a thirty-third position.

In some implementations, the operations comprise storing a first set of delimiter values and a second set of delimiter values; determining a value of the randomization bit; and selecting the delimiter from either the first set of delimiter values or the second set of delimiter values in response to determining the value of the randomization bit.

In some implementations, the operations comprise selecting the delimiter from the first set of delimiter values in response to determining that the randomization bit corresponds to a first value; and selecting the delimiter from the second set of delimiter values in response to determining that the value corresponds to a second value. In some implementations, the first set of delimiter values includes ternary triplets representing a start of frame, an end of frame, and an end of frame with error, and the second set of delimiter values includes ternary triplets representing the start of frame, the end of frame, and the end of frame with error. In some implementations, the ternary triplets of the second set of delimiter values are opposite in polarity from the ternary triplets of the first set of delimiter values.

In some implementations, the delimiter randomization bit is generated for a symbol transmitted before the delimiter, and the operations further comprise: storing a first set of disparity reset values and a second set of disparity reset values; and selecting the disparity reset value from either the first set of disparity reset values or the second set of disparity reset values in response to determining the value of the randomization bit. In some implementations, the selected disparity reset value is configured to balance polarity of ternary triplets, including the ternary triplet corresponding to the selected delimiter, to reduce DC offset in the sequence of transmitted symbols based on a running disparity of previously transmitted symbols.

In some implementations, after transmitting the delimiter, the operations further comprise randomizing a start value for running disparity. In some implementations, the start value is randomized to either a value of two or a value of three.

In some implementations, the delimiter is randomized using a linear feedback shift register.

This overview is intended to provide an overview of subject matter of the present patent application. It is not intended to provide an exclusive or exhaustive explanation of the inventive subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5A illustrates an example set of delimiters according to the disclosed embodiments.

FIG. 5B illustrates an example set of disparity reset values according to the disclosed embodiments.

BACKGROUND

Figure 1:
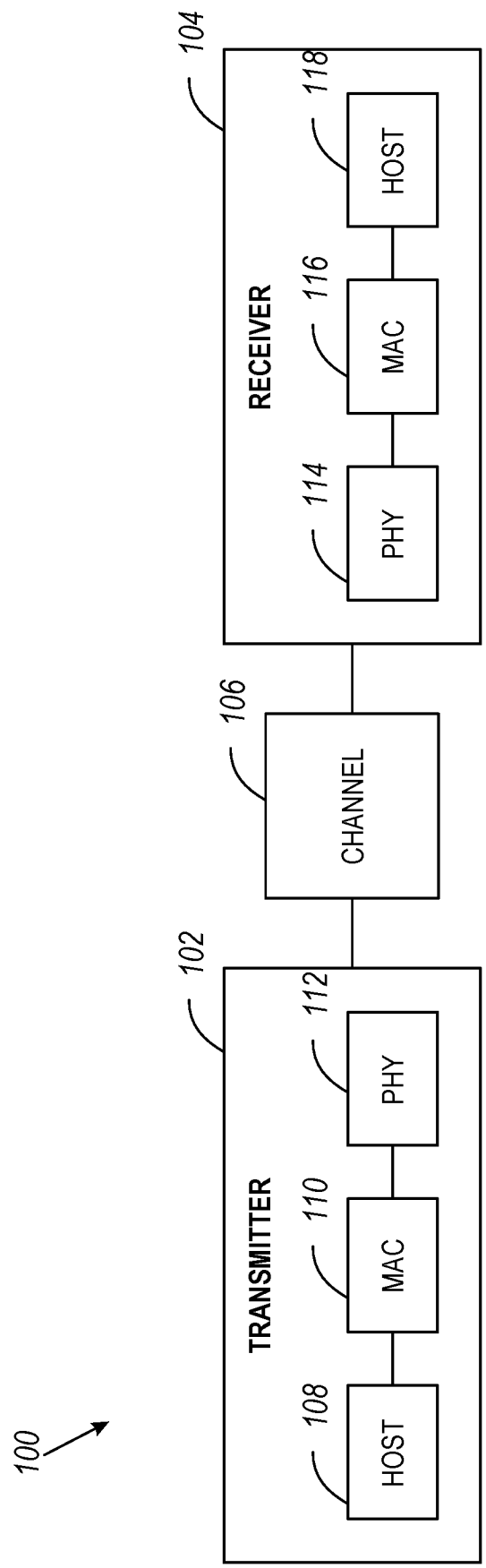
FIG. 1 is a block diagram of an example system in accordance with various embodiments.

Ethernet communications use a Physical Layer (PHY) device to exchange data. Delimiters are usually used to specify the start and end of frames for the data that is exchanged. These delimiters usually include fixed codes that are sequentially and continuously repeated at a constant rate.

DETAILED DESCRIPTION

Typical communication systems insert delimiter codes for signaling the beginning of a data frame (SSD or start of stream delimiter) and the end of a data frame (ESD or end of stream delimiter). These delimiters may also be embedded within a continuous data stream, consisting of idle data and user data and are used to mark the borders between the data streams. Delimiters typically comprise a fixed code. When using the delimiters, these codes may be sequentially and continuously repeated at a constant rate, if the length of the user data and the idle data is constant over time. For an Ethernet communication system, for example, the minimum frame length is 64 bytes, while the length of the inter-frame gap, during which idle data are transmitted, has a minimum length of 12 bytes or 96 bits.

Devices within control systems normally only transmit a small amount of data per frame, which can be as low as 2 or 4 bytes for a reasonable measurement resolution. For transmitting the same data using Ethernet, for example, the data packet size needs to be increased to a minimum frame length of 64 bytes. Therefore, in such systems, most of the packets have a frame length of 64 bytes. These frames are transmitted, in a bit-synchronous way, over an extended period of time. Assuming such a continuous constant transmission of these data packets, the delimiters may occur at the same intervals or frequency. This may lead to additional 'spikes' at discrete frequencies within the power density spectrum of the transmit signal, leading to higher levels of emissions. This increase, potentially or effectively, reduces the signal to noise ratio (SNR) of neighboring links due to additional noise ingress (or cross-talk).

In a full duplex communication system, two of these data streams are combined, while the PHY on one side of the link segment is transmitting the first data stream, the PHY on the opposite side of the link segment is transmitting the second data stream at the same time. Typically, the data of these two data streams are scrambled with different polynomials, so that they are statistically independent of/to each other, whereas the delimiters are not scrambled, so that they can easily be detected. In most cases, these communication systems use digital signal processing (DSP) to perform echo cancellation of the locally transmitted data stream, and equalization of the received far end data stream, using digital adaptive filters. These digital adaptive filters need to be trained on the transmitted symbols for the echo canceller and on the received symbols for the equalizer. For optimal training accuracy, the data streams need to be statistically independent.

If any training occurs at the position of the non-scrambled delimiters, then statistical independence is no longer provided for the duration of the delimiter sequence, because the delimiters are not scrambled and therefore identical. In combination with a reduced training speed, which allows for a reduced energy consumption and a higher overall system stability during normal operation of the PHY, this may lead to a situation where the overall number of training symbols within the data stream (e.g., a fixed 64 byte user and 12 byte idle data) is relatively low, e.g. only 8 to 10 symbols, which are used for filter training during this amount of transmitted data. In this case, if one of the symbols which is used for training, lies within the fixed delimiter, this may lead to a significant error during filter training.

Certain systems generate a complete transmit stream that includes delimiters and randomized data. The complete transmit stream that includes the delimiters and randomized data is then randomized. For example, in 1000BASE-T start and end frame delimiters are interleaved around scrambled data and then a final sign randomization step is applied. While these systems address some of the above shortcomings, they fail to consider the effect of the randomized delimiters and data on the DC content. As a result, there may be significant DC content in the signal which can have damaging consequences due to an increase in the signal range after it passes through isolation circuitry.

According to the disclosed embodiments, a solution for both problems, comprising the additional noise emissions and the training errors, resulting from fixed delimiters is provided. The disclosed approach randomizes delimiters and selects a disparity reset value on the basis of the randomized delimiters to generate an initial running disparity. Data is randomized independently of the delimiters and is encoded for transmission in a packet together with the delimiters according to the initial running disparity. This prevents the delimiters from being constant (fixed) and repeated and also ensures that the running disparity is not adversely impacted by the randomized delimiters. Therefore, the spikes or noise in the emission spectrum, and also the resulting training errors, can be reduced or eliminated. In some cases, the pseudo random sequence for toggling or changing the polarity of the delimiters may be achieved by using a linear feedback shift register (LFSR) for example. As a specific implementation, this may alternatively be achieved by using any suitable integrated scrambler or descrambler within the PHY.

FIG. 1 is a block diagram of an example Ethernet communications system 100 in accordance with various embodiments. Specifically, the system 100 is an illustrative IEEE 802.3 Ethernet communication system. While the disclosed embodiments are discussed with respect to wired IEEE 802.3 Ethernet, the teachings are similarly applicable to any other wired or wireless communication system.

As illustrated, a transmitter 102 communicates with one or more receivers, such as receiver 104, over a communications channel 106. The transmitter 102 and receiver 104 may be embodied in any one of a plurality of devices, including a switch, router, endpoint (e.g., computing device, such as a server, client, VOIP phone, wireless access point, etc.), or the like. The transmitter 102 comprises a host 108, media access control (MAC) 110, and a physical layer device (PHY) 112, while the receiver 104 includes a PHY 114, MAC 116, and host 118. While FIG. 1 and the description refers to a transmitter 102 and a receiver 104, either device can act as the transmitter 102 and/or receiver 104 (e.g., in a half-duplex or full-duplex arrangement).

In general, the hosts 108 and 118 include suitable logic, circuitry, and/or code that may enable operability and/or functionality of the five highest functional layers of an OSI model for data packets that are transmitted over the link. Since each layer in the OSI model provides a service to the immediately higher interfacing layer, the MACS 110 and 116 provide the necessary services to hosts 108 and 118 to ensure that packets are suitably formatted and communicated to the PHY 112 and PHY 114. The MACS 110 and 116 include suitable logic, circuitry, and/or code that may enable handling of data link layer (Layer 2) operability and/or functionality. The MACS 110 and 116 can be configured to implement Ethernet protocols, such as those based on the IEEE 802.3™ standard, for example. The PHY 112 and PHY 114 can be configured to handle physical layer requirements, which include, but are not limited to, packetization, data transfer and serialization/deserialization (SERDES) according to the 10BASE-T1L PHY standard of the IEEE 802.3 cg standard. Certain embodiments of an Ethernet PHY system that randomize delimiters and/or disparity reset values independently of randomizing the data are implemented at the PHY layer, as described further below.

The transmitter 102 and receiver 104 may operate according to one of a plurality of schemes. For instance, one scheme involves the use of an LPI technique. In general, LPI relies on turning the active communications channel 106 silent when there is nothing to transmit. Energy is thereby saved when the communications channel 106 (e.g., link) is off. Refresh signals can be sent periodically to enable wake up from the sleep mode.

As used herein, "Ethernet PHY" corresponds to PHY circuitry that complies and/or is compatible with one or more IEEE 802.3™ Ethernet communications protocols. The IEEE 802.3™ Ethernet communication protocol may include, for example, single-lane PHY protocols such as 10GBASE-KX, 10GBASE-KR, etc., and/or multi-lane PHY protocols such as 10GBASE-KX4, 40GBASE-KR4, 40GBASE-CR4, 100GBASE-CR10, 100GBASE-CR4, 100GBASE-KR4, and/or 100GBASE-KP4, etc., and/or 10BASE-T1L or other PHY circuitry that is compliant with the IEEE 802.3™ Ethernet communications protocol and/or compliant with an after-developed communications protocol and/or emerging PHY technology specifications such as 25GBASE-CR and/or 25GBASE-KR, etc.

Each PHY 112 circuitry includes respective transmit circuitry and respective receive circuitry and is configured to transmit data packets and/or frames to a remote device over a communications channel 106. Receive circuitry is configured to receive data packets and/or frames from another device in the communications channel 106. Each PHY 112 circuitry may include encoding/decoding circuitry (not shown) configured to perform analog-to-digital and digital-to-analog conversion, encoding and decoding of data, analog parasitic cancellation (for example, cross talk cancellation), and recovery of received data.

Figure 2:
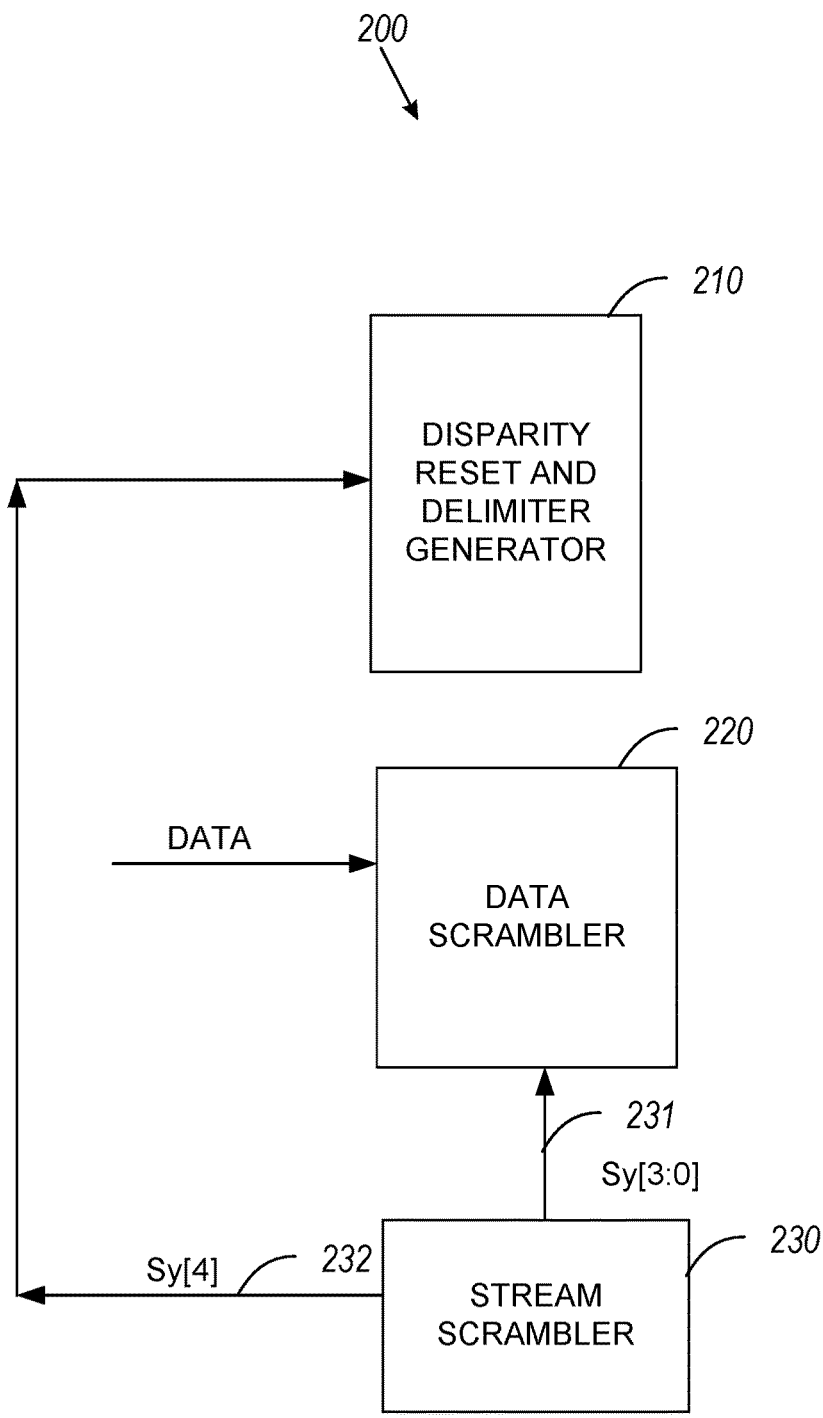
FIG. 2 illustrates an example frame generator according to the disclosed embodiments.

FIG. 2 illustrates an example frame generator 200 according to the disclosed embodiments. The frame generator 200 may be implemented by the PHY 112 and by the PHY 114. The frame generator 200 includes a stream scrambler 230, a data scrambler 220, and a disparity reset and delimiter generator 210. The stream scrambler 230 may implement a linear feedback shift register that generates 33 bits randomly (Scr[32:0]).

In some embodiments, the linear feedback shift register or stream scrambler 230 of the transmitter PHY 112 may be initialized with a random sequence. After being initialized, the stream scrambler 230 generates a new set of 33 bits randomly for each new symbol that is transmitted. The transmitter PHY 112 transmits an initialization symbol stream to the receiver PHY 114. The receiver PHY 114 determines from the initialization symbol stream the current state of the stream scrambler 230 and synchronizes the stream scrambler 230 at the receiver PHY 114 to the stream scrambler 230 of the transmitter PHY 112. Once the stream scramblers 230 at the transmitter PHY 112 and the receiver PHY 114 are synchronized, stream scramblers 230 generate the same 33 bits for each symbol.

A first subset of bits 231 of the 33 bits (e.g., Scr[32:0]) of the stream scrambler 230 is provided to the data scrambler 220. The first subset of bits 231 may include four bits generated using a polynomial function. Specifically, each bit of the first set of bits 231 may be generated by applying an XOR function to different combinations of bits of the 33 bits of the stream scrambler 230. For example, the first subset of bits 231 include Sy[3:0] generated as follows:

Sy[0]=Scr[0];
Sy[1]=Scr[3] XOR Scr[8];
Sy[2]=Scr[6] XOR Scr[16]; and
Sy[3]=Scr[9] XOR Scr[14] XOR Scr[19] XOR Scr[24]

Scr[0] represents the least significant bit of the data scrambler 220 and Scr[32] represents the most significant bit of the data scrambler 220. The data scrambler 220 receives a set of user data and scrambles or randomizes the user data using the first subset of bits 231. In some cases, the data scrambler 220 encodes the user data using the first subset of bits 231.

The disparity reset and delimiter generator 210 receives a delimiter randomization bit 232 from the stream scrambler 230. The delimiter randomization bit 232 is used to select between different subsets of delimiter values and/or disparity reset values. Specifically, the disparity reset and delimiter generator 210 stores a first subset of delimiter values that include ternary triplets for representing a start of frame, an end of frame and an end of frame with error. The end of frame with error represents an errored transmission that has occurred during data transmission. The disparity reset and delimiter generator 210 stores a second subset of delimiter values that include ternary triplets for representing the start of frame, the end of frame and the end of frame with error. In some circumstances, the ternary triplets in the second subset are of opposite polarity from the ternary triplets in the first subset of delimiter values. By selectively choosing delimiter values from either the first subset or the second subset on the basis of the delimiter randomization bit 232, the delimiter value is randomized or scrambled independently of the data.

An example set of different delimiter values that are stored by the disparity reset and delimiter generator 210 is shown in FIG. 5A. For example, FIG. 5A shows a first subset of the delimiter values 510 and a second subset of delimiter reset values 520. The first subset of the delimiter values 510 corresponds to a first value of the delimiter randomization bit 232 (e.g., Sy[4]=0) and the second subset of the delimiter values 520 corresponds to a second value of the delimiter randomization bit 232 (e.g., Sy[4]=1). The first subset of the delimiter values 510 includes a start of frame delimiter (e.g., SSD4) with a first ternary triplet (e.g., +1, +1, −1). The second subset of the delimiter values 520 includes a start of frame delimiter (e.g., SSD4) with a second ternary triplet (e.g., −1, −1, +1) that is of the opposite polarity of the first ternary triplet of the start of frame delimiter of the first subset of the delimiter values 510. As another example, the first subset of the delimiter values 510 includes an end of frame delimiter (e.g., ESD4) with a third ternary triplet (e.g., +1, −1, +1). The second subset of the delimiter values 520 includes an end of frame delimiter (e.g., ESD4) with a fourth ternary triplet (e.g., −1, +1, −1) that is of the opposite polarity of the third ternary triplet of the end of frame delimiter of the first subset of the delimiter values 510. Depending on the delimiter randomization bit 232 value, the disparity reset and delimiter generator 210, when sending the start of frame delimiter, selects to send either the first ternary triplet or the second ternary triplet.

The delimiter randomization bit 232 may correspond to one of the 33 bits (e.g., Scr[32:0]) of the stream scrambler 230. The delimiter randomization bit 232 may be generated using a polynomial function applied to the 33 bits of the stream scrambler 230. For example, the delimiter randomization bit 232 may be generated by applying an XOR function to different combinations of bits of the 33 bits of the stream scrambler 230. Specifically, the delimiter randomization bit 232 may include Sy[4] generated by Sy[4]=Scr[12] XOR Scr[32] (e.g., the randomization bit is generated by applying an XOR function to the 13$^{th}$ bit position and the 33$^{rd}$ bit position of the 33 bits of the stream scrambler 230.

In some embodiments, the disparity reset and delimiter generator 210 may generate a disparity reset value for inclusion and transmission with the randomized delimiter based on the delimiter randomization bit 232 to generate an initial (known) running disparity. Specifically, the disparity reset and delimiter generator 210 stores a first subset of disparity reset values that include ternary triplets for compensating for or offsetting polarities introduced by the first subset of delimiter values. The disparity reset and delimiter generator 210 stores a second subset of disparity reset values that include ternary triplets for compensating for or offsetting polarities introduced by the second subset of delimiter values. By selectively choosing disparity reset values from either the first subset or the second subset on the basis of the delimiter randomization bit 232 (which is used to randomize the delimiter), the disparity reset value is randomized or scrambled independently of the data and is selected to compensate for or offset polarities introduced by the randomized subset of delimiter values. In this way, the disparity reset value is selected based on the randomized delimiter to generate an initial running disparity.

The running disparity represents an accumulation of bit polarities or signs previously transmitted over the network. The running disparity may be reset or initialized at the start and/or the end of each frame or sequence of frames to a starting or initial value, such as after a start of frame delimiter or an end of frame delimiter is transmitted. This initial or starting value may be selected based on the randomized delimiter to generate an initial running disparity. In an embodiment, the running disparity is used to determine how far away from 0 the accumulated sign is drifting. For example, if the running disparity exceeds 0 by more than a threshold, the running disparity is offset or reduced by selecting different ternary triplets for representing data in a subsequent symbol. This avoids transmitting more positive bits over the network than negative bits.

As an example, the running disparity may be reset to a start value of either 2 or 3 on the basis of the delimiter randomization bit 232. The running disparity may accumulate starting from the start value the polarities or signs of the bits transmitted over the network. Based on the current value of the running disparity or the initial randomized starting value of the running disparity (that may be selected based on the randomized delimiter), different subsets of bit polarities are selected to represent a given set of data. This way, the overall DC offset of the signal transmitted can be limited.

For example, if the randomized delimiter selected using the delimiter randomization bit 232 will end up increasing the running disparity by 1, then the disparity reset value that is transmitted before the randomized delimiter is selected to reset the running disparity to 2. This ensures that the total disparity introduced by the transmission of the disparity reset and the delimiter resets the transmit disparity to a known value. This known value can then be used to control how the randomized data is encoded into ternary triplets, such as by selecting different ternary triplets for representing data in a subsequent symbol.

In one example, the initial or starting value of the running disparity is computed using a DISPRES function. The DISPRES function returns one of eight possible DISPRESET3 triple ternary symbols based on the value of the delimiter randomization bit 232. An illustrative output of the eight possible DISPRESET3 triple ternary symbols is shown in FIG. 5B. Because the DISPRES function is based on the value of the delimiter randomization bit 232, the starting value of the running disparity is randomized which causes the data to also be randomized and encoded according to a randomly chosen and selected initial running disparity.

In one example, a RND_SSD4 function is implemented by the disparity reset and delimiter generator 210. The RND_SSD4 function generates a start of frame delimiter based on the delimiter randomization bit 232. Specifically, the RND_SSD4 function receives the delimiter randomization bit 232 of the previous symbol interval (the delimiter randomization bit 232 used to select the disparity reset value sent in a previous symbol) and returns the corresponding ternary triplet for the start of frame delimiter (e.g., selected from subset of the delimiter values 510 or subset of the delimiter values 520, FIG. 5A) and the associated transmit disparity reset value. The returned transmit disparity reset value depends on the value of the delimiter randomization bit 232 of the previous symbol interval and may represent the value 2 if the delimiter randomization bit 232 of the previous symbol interval was the value 0 and may represent the value 3 if the delimiter randomization bit 232 of the previous symbol interval was the value 1.

In one example, a RND_ESD4 function is implemented by the disparity reset and delimiter generator 210. The RND_ESD4 function generates an end of frame delimiter based on the delimiter randomization bit 232. Specifically, the RND_ESD4 function receives the delimiter randomization bit 232 of the previous symbol interval (the delimiter randomization bit 232 used to select the disparity reset value sent in a previous symbol) and returns the corresponding ternary triplet for the end of frame delimiter (e.g., selected from subset of the delimiter values 510 or subset of the delimiter values 520, FIG. 5A) and the associated transmit disparity reset value. The returned transmit disparity reset value depends on the value of the delimiter randomization bit 232 of the previous symbol interval and may represent the value 2 if the delimiter randomization bit 232 of the previous symbol interval was the value 0 and may represent the value 3 if the delimiter randomization bit 232 of the previous symbol interval was the value 1.

In one example, a RND_ESD_ERR4 function is implemented by the disparity reset and delimiter generator 210. The RND_ESD_ERR4 function generates an error in frame delimiter based on the delimiter randomization bit 232. Specifically, the RND_ESD_ERR4 function receives the delimiter randomization bit 232 of the previous symbol interval (the delimiter randomization bit 232 used to select the disparity reset value sent in a previous symbol) and returns the corresponding ternary triplet for the error in frame delimiter (e.g., selected from subset of the delimiter values 510 or subset of the delimiter values 520, FIG. 5A) and the associated transmit disparity reset value. The returned transmit disparity reset value depends on the value of the delimiter randomization bit 232 of the previous symbol interval and may represent the value 2 if the delimiter randomization bit 232 of the previous symbol interval was the value 0 and may represent the value 3 if the delimiter randomization bit 232 of the previous symbol interval was the value 1.

Figure 3:
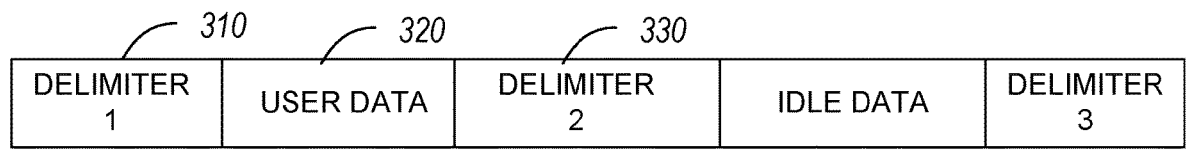
FIG. 3 illustrates an example set of frames according to the disclosed embodiments.

The output disparity reset value and delimiter of the disparity reset and delimiter generator 210 that are randomized is combined (e.g., linearly) with the scrambled or randomized data from the data scrambler 220 to generate a packet or frame. The packet or frame is then sent to another PHY device via the network. An example frame sequence is shown in FIG. 3. As shown in FIG. 3, the frame sequence includes a delimiter 1 310 (e.g., a start of frame delimiter), user data 320 (e.g., scrambled or randomized user data), and a delimiter 2 330 (e.g., an end of frame delimiter).

Figure 4:
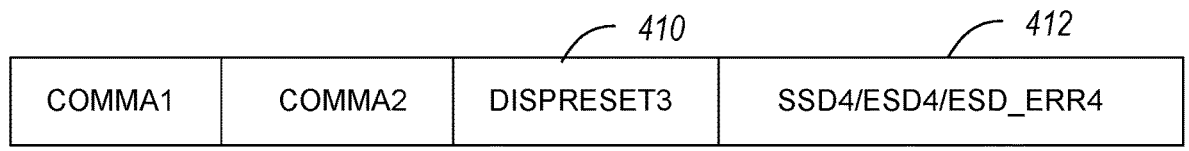
FIG. 4 illustrates an example delimiter according to the disclosed embodiments.

An example delimiter is shown in FIG. 4. The delimiter 1 310 may include four segments, a COMMA1 (e.g., having all ZEROS) segment, a COMMA2 (e.g., having all ZEROS) segment, a DISPRESET3 410 segment (that includes the disparity reset value), and a particular delimiter value 412 (e.g., start of frame SSD4, end of frame ESD4, or end of frame with error ESD_ERR4 value). Although the DISPRESET3 410 segment is shown as being transmitted before the delimiter value 412, the DISPRESET3 410 may be sent after the delimiter value 412 in the delimiter 310.

In some embodiments, the delimiter 1 310 may correspond to SSD4 value (e.g., with ternary triplet +1, +1, −1) in response to the delimiter randomization bit 232 of the previous symbol interval having a '0' value. In such cases, the DISPRESET3 410 segment of the delimiter value may be selected based on the delimiter randomization bit 232 of the previous symbol interval to offset the bit polarities of the SSD4 value. For example, the DISPRESET3 410 value is selected according to FIG. 5B from the first set of disparity reset values 530. In such cases, the DISPRESET3 410 value may be one of the ternary triplets (−1, 0, 1), (−1, 0, 0), (−1, 0, −1) or (−1, −1, −1) which offsets or compensates for the polarity of the SSD4 value (+1, +1, −1) and resets the running disparity to a starting value of 2. Data is then encoded according to this starting value of 2 of the running disparity.

The delimiter 2 330 may correspond to ESD4 value (e.g., with ternary triplet −1, +1, −1) in response to the delimiter randomization bit 232 of the previous symbol interval having a '1' value. In such cases, the DISPRESET3 410 segment of the delimiter value may be selected based on the delimiter randomization bit 232 of the previous symbol interval to offset the bit polarities of the ESD4 value. For example, the DISPRESET3 410 is selected according to FIG. 5B from the second set of disparity reset values 540. In such cases, the DISPRESET3 410 value may be one of the ternary triplets (1, 1, 1), (1, 0, 1), (1, 0, 0) or (1, 0, −1) which offsets or compensates for the polarity of the SSD4 value (−1, +1, −1) and resets the running disparity to a starting value of 3. In this way, if the delimiter value 412 that is transmitted as part of the delimiter 310 will end up increasing the running disparity by 1, the DISPRESET3 410 value is selected to reset the running disparity to 2. If the delimiter value 412 that is transmitted as part of the delimiter 310 will end up decreasing the running disparity by 1, the DISPRESET3 410 value is selected to reset the running disparity to 3.

In some embodiments, if the delimiter value 412 that is transmitted as part of the delimiter 310 will end up increasing the running disparity by 1, the DISPRESET3 410 value is selected to reset the running disparity to 3, and, if the delimiter value 412 that is transmitted as part of the delimiter 310 will end up decreasing the running disparity by 1, the DISPRESET3 410 value is selected to reset the running disparity to 2.

Figure 6:
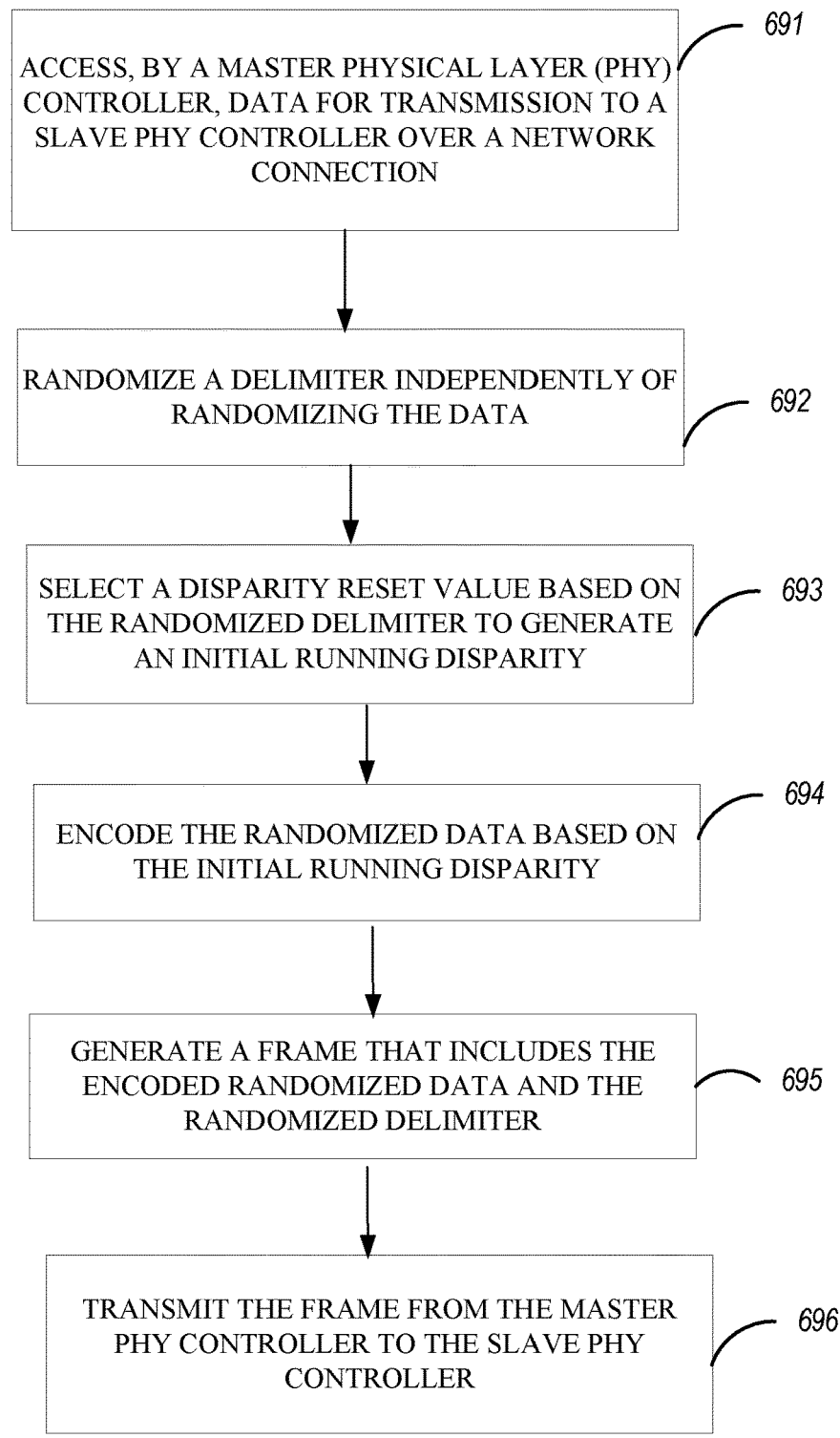
FIG. 6 is a flow chart illustrating an example process for compensating for correlation and spectral spikes caused by delimiters according to the disclosed embodiments.

FIG. 6 illustrates an example process 690 for compensating for correlation and spectral spikes caused by delimiters according to the disclosed embodiments.

The process 690 includes various operations that are performed by PHY controllers at a transmitter and receiver PHY device. These operations can be stored as non-transitory instructions on non-transitory computer-readable medium that can be executed by a respective processor on the PHY controller.

At operation 691, the transmitter PHY controller accesses data for transmission to a receiver PHY controller over a network connection. For example, the disparity reset and delimiter generator 210 receives data (idle or user data) and processes the data with the data scrambler 220.

At operation 692, the transmitter PHY controller randomizes a delimiter independently of randomizing the data. For example, the disparity reset and delimiter generator 210 randomizes the delimiter using the disparity reset and delimiter generator 210 independently of the data scrambler 220 randomizing the data. Specifically, the disparity reset and delimiter generator 210 receives the delimiter randomization bit 232 (e.g., Sy[4] bit position 5 from the stream scrambler 230) and the data scrambler 220 receives the first subset of bits 231 from the stream scrambler. The disparity reset and delimiter generator 210 selects between two subsets of delimiter values each representing a same set of delimiters using different ternary triplets based on the delimiter randomization bit 232.

At operation 693, the PHY controller selects a disparity reset value based on the randomized delimiter to generate an initial running disparity. For example, the disparity reset and delimiter generator 210 stores a first subset of disparity reset values that include ternary triplets for compensating for or offsetting polarities introduced by the first subset of delimiter values. The disparity reset and delimiter generator 210 stores a second subset of disparity reset values that include ternary triplets for compensating for or offsetting polarities introduced by the second subset of delimiter values. The disparity reset and delimiter generator 210 selectively chooses disparity reset values from either the first subset or the second subset on the basis of the delimiter randomization bit 232 (which is used to randomize the delimiter). These disparity reset values when sent with the randomized delimiter result in a running disparity having an initial known value. In this way, the disparity reset value is selected based on the randomized delimiter to generate an initial running disparity.

At operation 694, the PHY controller encodes the randomized data based on the initial running disparity. For example, disparity reset and delimiter generator 210 selects different ternary triplets to encode the randomized data in a subsequent symbol based on the initial running disparity.

At operation 695, the PHY controller generates a frame that includes the encoded randomized data and the randomized delimiter. For example, the disparity reset and delimiter generator 210 combines or multiplexes the encoded randomized data and the randomized delimiter.

At operation 696, the transmitter PHY controller transmits the frame to the receiver PHY controller. For example, the disparity reset and delimiter generator 210 of the transmitter PHY 112 transmits the frame over the communications channel 106 to a receiver PHY 114.

Figure 7:
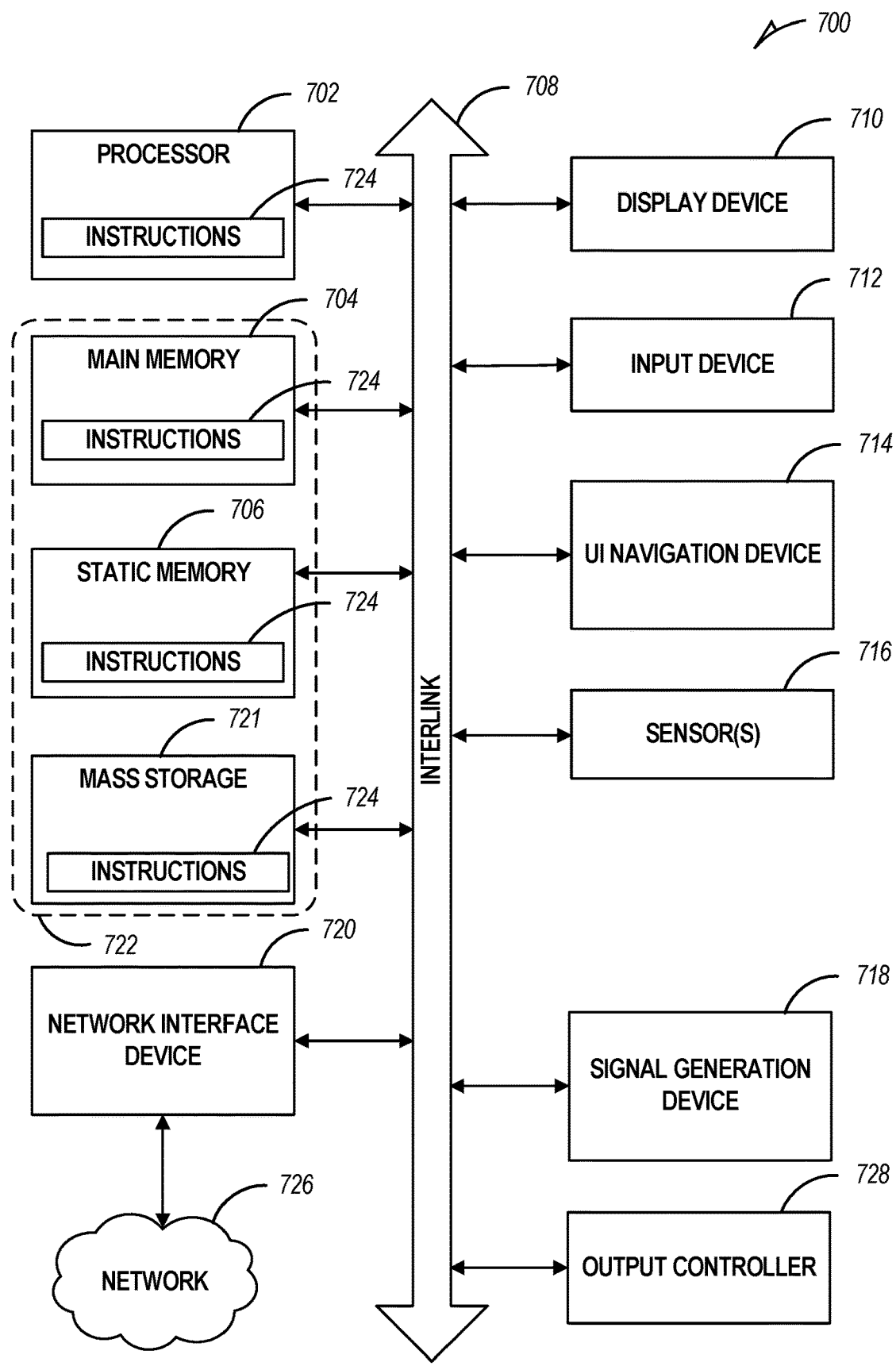
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, an IoT device, automotive system, an aerospace system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 700 may include a hardware processor 702 (e.g., a central processing unit (CPU), a graphics processing unit (GPU), a hardware processor core, or any combination thereof, such as a memory controller, etc.), a main memory 704, and a static memory 706, some or all of which may communicate with each other via an interlink (e.g., bus) 708. The machine 700 may further include a display device 710, an alphanumeric input device 712 (e.g., a keyboard), and a user interface (UI) navigation device 714 (e.g., a mouse). In an example, the display device 710, input device 712, and UI navigation device 714 may be a touch screen display. The machine 700 may additionally include a machine-readable medium 722 (e.g., a drive unit), a signal generation device 718 (e.g., a speaker), a network interface device 720, one or more sensors 716, such as a global positioning system (GPS) sensor, wing sensors, mechanical device sensors, temperature sensors, ICP sensors, bridge sensors, audio sensors, industrial sensors, compass, accelerometer, or other sensors. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The machine-readable medium 722 may include a storage device 721 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 721 may constitute the machine-readable medium 722.

While the machine-readable medium 722 is illustrated as a single medium, the term "machine-readable medium" may include a single medium or multiple media (e.g., a centralized or distributed database, or associated caches and servers) configured to store the one or more instructions 724.

The term "machine readable medium" may include any transitory or non-transitory medium that is capable of storing, encoding, or carrying transitory or non-transitory instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 (e.g., software, programs, an operating system (OS), etc.) or other data that are stored on the storage device 721 can be accessed by the memory 704 for use by the processor 702. The memory 704 (e.g., DRAM) is typically fast, but volatile, and thus a different type of storage than the storage device 721 (e.g., an SSD), which is suitable for long-term storage, including while in an "off" condition. The instructions 724 or data in use by a user or the machine 700 are typically loaded in the memory 704 for use by the processor 702. When the memory 704 is full, virtual space from the storage device 721 can be allocated to supplement the memory 704; however, because the storage device 721 is typically slower than the memory 704, and write speeds are typically at least twice as slow as read speeds, use of virtual memory can greatly reduce user experience due to storage device latency (in contrast to the memory 704, e.g., DRAM). Further, use of the storage device 721 for virtual memory can greatly reduce the usable lifespan of the storage device 721.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible or intangible medium that is capable of storing, encoding or carrying instructions for execution by the machine 700, and includes digital or analog communications signals or other tangible or intangible medium to facilitate communication of such software.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in a aspect are still deemed to fall within the scope of that aspect. Moreover, in the following aspects, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with transitory or non-transitory instructions operable to configure an electronic device to perform methods as described in the above examples. An implementation of such methods may include code, such as microcode, assembly language code, a higher-level language code, or the like. Such code may include transitory or non-transitory computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the aspects. Also, in the above Detailed Description, various features may be grouped together to streamline the disclosure. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments may be combined with each other in various combinations or permutations. The scope of the inventive subject matter should be determined with reference to the appended aspects, along with the full scope of equivalents to which such aspects are entitled.

What is claimed is:

1. A method comprising:
   accessing, by a transmitter physical layer (PHY) controller, data for transmission to a receiver PHY controller over a network connection;
   randomizing a delimiter independently of randomizing the data;
   selecting a disparity reset value based on the randomized delimiter to generate an initial running disparity;
   encoding the randomized data based on the initial running disparity;
   generating a frame that includes the encoded randomized data and the randomized delimiter; and
   transmitting the frame from the transmitter PHY controller to the receiver PHY controller.

2. The method of claim 1, wherein the network comprises an Ethernet wired connection, and wherein the data is transmitted over the network in accordance with a 10BASE-T1L implementation.

3. The method of claim 1, further comprising generating a delimiter randomization bit as a function of two or more bits of the set of bits.

4. The method of claim 3, wherein the function comprises an XOR operation, and wherein the two or more bits include a bit in a thirteenth position a bit in a thirty-third position.

5. The method of claim 3, further comprising:
   storing a first set of delimiter values and a second set of delimiter values;
   determining a value of the randomization bit; and
   selecting the delimiter from either the first set of delimiter values or the second set of delimiter values in response to determining that the value of the randomization bit.

6. The method of claim 5, further comprising:
selecting the delimiter from the first set of delimiter values in response to determining that the randomization bit corresponds to a first value; and
selecting the delimiter from the second set of delimiter values in response to determining that the value corresponds to a second value.

7. The method of claim 5, wherein the first set of delimiter values includes ternary triplets representing a start of frame, an end of frame, and an end of frame with error, wherein the second set of delimiter values includes ternary triplets representing the start of frame, the end of frame, and the end of frame with error.

8. The method of claim 7, wherein the ternary triplets of the second set of delimiter values are opposite in polarity from the ternary triplets of the first set of delimiter values.

9. The method of any of claims 5, wherein the delimiter randomization bit is generated for a symbol transmitted before the delimiter, further comprising:
storing a first set of disparity reset values and a second set of disparity reset values; and
selecting the disparity reset value from either the first set of disparity reset values or the second set of disparity reset values in response to determining that the value of the randomization bit.

10. A system comprising:
a memory configured to store operations; and one or more processors, which is coupled to the memory, configured to perform the operations comprising:
accessing, by a transmitter physical layer (PHY) controller, data for transmission to a receiver PHY controller over a network connection;
randomizing a delimiter independently of randomizing the data;
selecting a disparity reset value based on the randomized delimiter to generate an initial running disparity;
encoding the randomized data based on the initial running disparity;
generating a frame that includes the encoded randomized data and the randomized delimiter; and
transmitting the frame from the transmitter PHY controller to the receiver PHY controller.

11. The system of claim 10, wherein the network comprises an Ethernet wired connection, and wherein the data is transmitted over the network in accordance with a 10BASE-T1L implementation.

12. The system of claim 10, further comprising operations for obtaining a set of bits from a scrambler in the transmitter PHY controller.

13. The system of claim 12, further comprising operations for generating a delimiter randomization bit as a function of two or more bits of the set of bits.

14. The system of claim 13, further comprising operations for:
storing a first set of delimiter values and a second set of delimiter values;
determining a value of the delimiter randomization bit; and
selecting the delimiter from either the first set of delimiter values or the second set of delimiter values in response to determining that the value of the randomization bit.

15. A non-transitory computer-readable medium comprising computer-readable instructions that, when executed by one or more processors, configure the one or more processors to perform operations comprising:
accessing, by a transmitter physical layer (PHY) controller, data for transmission to a receiver PHY controller over a network connection;
randomizing a delimiter independently of randomizing the data;
selecting a disparity reset value based on the randomized delimiter to generate an initial running disparity;
encoding the randomized data based on the initial running disparity;
generating a frame that includes the encoded randomized data and the randomized delimiter; and
transmitting the frame from the transmitter PHY controller to the receiver PHY controller.

16. The computer-readable medium of claim 15, wherein the network comprises an Ethernet wired connection, and wherein the data is transmitted over the network in accordance with a 10BASE-T1L implementation.

17. The computer-readable medium of claim 15, further comprising operations for obtaining a set of bits from a scrambler in the transmitter PHY controller.

18. The computer-readable medium of claim 17, further comprising operations for generating a delimiter randomization bit as a function of two or more bits of the set of bits.

19. The computer-readable medium of claim 18, wherein the function comprises an XOR operation, and wherein the two or more bits include a bit in a thirteenth position a bit in a thirty-third position.

20. The computer-readable medium of claim 18, further comprising operations for:
storing a first set of delimiter values and a second set of delimiter values;
determining a value of the delimiter randomization bit; and
selecting the delimiter from either the first set of delimiter values or the second set of delimiter values in response to determining that the value of the randomization bit.

* * * * *

UNITED STATES PATENT AND TRADEMARK OFFICE
CERTIFICATE OF CORRECTION

PATENT NO. : 11,785,122 B2
APPLICATION NO. : 17/611852
DATED : October 10, 2023
INVENTOR(S) : Curran et al.

It is certified that error appears in the above-identified patent and that said Letters Patent is hereby corrected as shown below:

On the Title Page

Item (72) "Inventors", in Column 1, Line 1, after "Dublin", insert --4--

Item (72) "Inventors", in Column 1, Line 2, delete "Twinsburg, OH (US)" and insert --Rhineland-Palatinate (DE)-- therefor Item (57) Column 1, under "Abstract", Line 3, delete "miming" and insert --running-- therefor Signed and Sealed this
Twenty-eighth Day of January, 2025

Coke Morgan Stewart
*Acting Director of the United States Patent and Trademark Office*